United States Patent [19]

Finkelstein

[11] Patent Number: 5,122,401
[45] Date of Patent: Jun. 16, 1992

[54] SCENTED POLE COVER

[75] Inventor: Harvey Finkelstein, Mahwah, N.J.

[73] Assignee: Tri-Seal International, Inc., Blauvelt, N.Y.

[21] Appl. No.: 259,599

[22] Filed: Oct. 19, 1988

[51] Int. Cl.[5] .................. B29D 23/00; B32B 27/08; B32B 31/18

[52] U.S. Cl. .................. 428/36.5; 138/128; 264/146; 264/209.1; 264/210.6; 428/36.91; 428/905

[58] Field of Search ............. 264/146, 173, 209.1, 264/210.6, 211; 428/36.6, 36.9, 36.91, 36.92, 905, 35.6, 319.7, 319.9, 36.5; 138/128

[56] References Cited

U.S. PATENT DOCUMENTS

| | | | |
|---|---|---|---|
| 1,778,392 | 10/1930 | Kinkead | 428/36.9 X |
| 3,336,554 | 8/1967 | Hatton | 428/36.91 X |
| 4,095,031 | 6/1978 | Engle | 264/211 X |
| 4,107,247 | 8/1978 | Dukess | 264/45.9 |
| 4,713,291 | 12/1987 | Sasaki et al. | 428/36.91 X |

FOREIGN PATENT DOCUMENTS

| | | | |
|---|---|---|---|
| 861988 | 1/1971 | Canada | 264/146 |
| 3605881 | 8/1987 | Fed. Rep. of Germany | 264/209.1 |
| 57-69022 | 4/1982 | Japan | 428/36.91 |

Primary Examiner—Leo B. Tentoni
Attorney, Agent, or Firm—Laubscher, Presta & Laubscher

[57] ABSTRACT

A scented pole cover for covering closet poles, shower curtain poles or the like is disclosed. The pole cover is an elongate, hollow object having a slit along the entire length thereof. In operation, the slit is expanded to fit over a pole and the pole cover snaps into snug engagement about the pole. Also disclosed are extrusion methods for fabricating the pole cover of the invention.

4 Claims, 2 Drawing Sheets

5,122,401

SCENTED POLE COVER

FIELD OF THE INVENTION

The present invention relates generally to scented pole covers and more particularly to pole covers which provide a pleasant scent to bathrooms, closets or other areas, without interfering with the utility of the covered pole.

BACKGROUND OF THE INVENTION

It is generally recognized that certain household areas, particularly bathrooms and closet areas, may become damp, musty or dirty and exude an unpleasant smell. Numerous methods have been proposed for overcoming unpleasant scents in the bathroom and closet areas. For example, scented sprays have been used as well as scented cleaning materials. Further, solid air-fresheners have been developed for providing a pleasant scent in bathroom and closet areas. These solid air-fresheners are generally free-standing objects which may be placed in key locations to improve the olfactory presence. However, these devices suffer from several disadvantages. First, they do not last long and must be frequently replaced. Secondly, they take up space on shelves or other locations.

Another problem which is encountered in bathroom and closet areas is the unsightly nature of the poles upon which shower curtains or hangers are hung. These poles are generally long, cylindrical, unfinished metal or wooden objects which generally detract from the aesthetic appearance of bathroom and closet areas.

Accordingly, there is a need in the art for an apparatus for improving the aesthetic appearance of poles in bathrooms, closets, etc. In addition, these areas also generally need a means for providing a pleasant or desired scent therein.

SUMMARY OF THE INVENTION

In one embodiment, the present invention relates to a decorative, scented pole cover. The pole cover is an elongate, hollow member having a slit along the entire length thereof to allow the hollow member to be placed over an elongate pole. The hollow member also includes a fragrant material for providing a pleasant smell in the vicinity of the pole cover.

In a second embodiment, the present invention relates to a method of manufacturing a decorative, scented pole cover. The method includes the steps of mixing plastic and a fragrant material to form a substantially homogeneous mixture and extruding the substantially homogeneous mixture to produce an integral, elongate member suitable for use as a scented pole cover.

It is the primary object of the present invention to provide a pole cover which is both decorative and scented.

It is a still further object of the present invention to provide a method of manufacturing decorative, scented pole covers.

These and other objects of the present invention will be apparent to one of ordinary skill in the art from the detailed description which follows.

DETAILED DESCRIPTION OF THE DRAWINGS

DETAILED DESCRIPTION OF THE PREFERRED EMBODIMENTS

Figure 1:
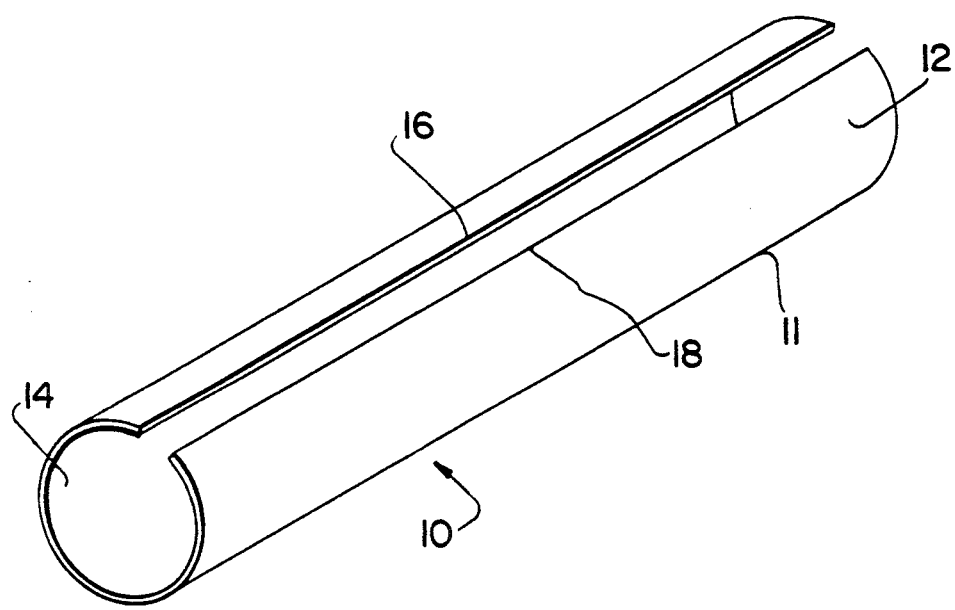
FIG. 1 is a perspective view of a pole cover in accordance with the present invention.

Referring to FIG. 1, there is shown a perspective view of a pole cover in accordance with the present invention. Pole cover 10 is made up of an integral, hollow, cylindrical body 11 having an outer surface 12 and an inner surface 14. Integral body 11 includes elongated edges 16 and 18 which define a longitudinal slit in pole cover 10.

Figure 2:
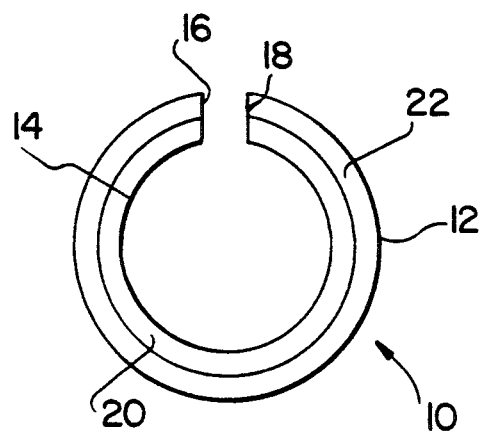
FIG. 2 is a cross-sectional view of an alternative embodiment of a pole cover in accordance with the present invention.

Referring now to FIG. 2, there is shown a cross-sectional view of a second embodiment of pole cover 10. In this embodiment, pole cover 10 is made up of two concentric layers 20 and 22. Inner layer 20 includes the inner surface 14 of pole cover 10 and outer layer 22 includes the outer surface 12 of pole cover 10.

Figure 3:
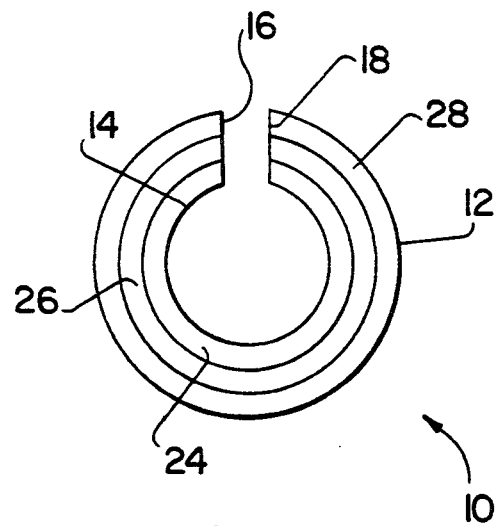
FIG. 3 is a cross-sectional view of a third embodiment of a pole cover in accordance with the present invention.

Referring to FIG. 3, there is shown a cross-sectional view of a third embodiment of the present invention. In this embodiment, pole cover 10 is made up of three concentric layers of material. Pole cover 10 includes inner layer 24, middle layer 26 and outer layer 28. Inner layer 24 includes inner surface 14 and outer layer 28 includes outer surface 12.

Pole cover 10 of the present invention includes a fragrant material therein. The fragrant material provides a pleasant or desired scent in the vicinity of pole cover 10. Conventional fragrant materials such as pine, cedar, wintergreen and other pleasant scented materials can be employed in the present invention. The scented material may be used in either liquid or solid form when fabricating the pole covers of the present invention. Preferably, enough scented material is included in pole cover 10 to provide a long-lasting, pleasant scent in the vicinity of the pole cover which may last several months.

Outer surface 12 of pole cover 10 is preferably an aesthetically pleasing color or pattern. In this manner, pole cover 10 can become part of the decoration of the room in which it is placed. Solid materials or patterns may be used for outer surface 12 or, in the multi-layered embodiments, a decorative outer layer can be employed in order to present a pleasing, aesthetic appearance.

Pole cover 10 may be made of any suitable, known material. Materials such as plastics are preferred because of their durability, low-cost and ease of fabrication. Particularly good plastics are polyvinyl chloride and polyolefins, although other suitable plastics may be employed. In the multi-layered embodiments, several different materials can be used in the same pole cover 10. In this manner specialized pole covers suitable for specific applications can be manufactured.

Pole cover 10 may be of any suitable dimensions. Typically, pole cover 10 will be sized to fit snugly over a closet pole used to hang clothing, or a shower curtain pole used to hang shower curtains. However, other sized or shaped pole covers are contemplated within the scope of the present invention for covering, e.g., square or hexagonal as well as round poles, lamp or structural poles or posts, or any other type of elongate objects.

Pole cover 10 must be capable of snapping over a pole and fitting snugly thereto. Thus, the materials used to fabricate pole cover 10 must be capable of at least a minimum amount of elastic deformation so that the slit in pole cover 10 can be expanded to sufficient dimensions to allow pole cover 10 to snap over a pole. Preferably, pole cover 10 will be fabricated from a material having memory such that it will return to its original configuration once it is placed on a pole.

In one specialized embodiment, pole cover 10 includes a smooth outer surface 12 adapted to allow hangers or shower curtain rings to slide along its surface. Pole covers 10 with a smooth outer surface 12 are also quite suitable for fire poles, for example. Also, this specialized embodiment may include a rough or deformable inner surface 14 which provides frictional engagement with the pole being covered. In this manner, pole cover 10 can be prevented from slipping along the pole as long as it fits snugly and the rough side engages the pole. Textured plastics or foam plastics are particularly suitable for providing a rough inner surface 14.

Pole cover 10 may be manufactured by any suitable, conventional method known to those of ordinary skill in the art. However, the preferred method for fabricating pole cover 10 is by extrusion.

To fabricate a pole cover 10 in accordance with the present invention by extrusion, the plastic or other material used to make pole cover 10 is mixed in either liquid or solid form, with a fragrant material. Preferably, the fragrant material is in the same physical form as the pole cover material, although this is not necessary. A substantially homogeneous mixture of pole cover material and fragrant material is prepared and fed to an extruder which extrudes a solid pole cover such as that shown in FIG. 1, having fragrant material impregnated or encapsulated therein. In use the fragrant material will gradually leach out of the pole cover material to provide a pleasant or desired aroma in the vicinity of the pole cover. Thus, it is also desirable to select a pole cover material which will allow fragrant materials to gradually leach out from it over extended time periods.

Pole cover 10 may also be extruded as an integral, elongate, hollow member and then cut along its entire length to provide a longitudinal slit therein.

The multi-layer pole covers, such as those shown in FIGS. 2 and 3, may be fabricated by co-extrusion. Suitable co-extrusion methods for use in the present invention are disclosed in U.S. Pat. No. 4,107,247, issued on Aug. 15, 1978, the disclosure of which is hereby incorporated by reference.

Multi-layered pole covers 10 can be fabricated having different materials for each layer. This allows for specialized properties in a pole cover not achievable by prior art methods. For example, the pole cover of FIG. 3 can include three different scents therein as long as the materials for each layer include a specific scent and the materials for each layer are selected to provide the necessary mass transfer properties such that all three scents will penetrate to the surface of pole cover 10 and be dispersed into the atmosphere in the vicinity of the pole cover. In addition, pole covers having a smooth outer surface and a rough inner surface of a different material can also be fabricated by co-extrusion methods. An example of a multi-layered material which may be used to fabricate the pole cover of the present invention is also disclosed in U.S. Pat. No. 4,107,247 issued on Aug. 15, 1978.

The foregoing description of embodiments has been presented for illustration and description only. Many modifications and variations will be apparent to one of ordinary skill in the art in light of the above teachings. Accordingly, the scope of the invention is to be defined by the claims appended hereto.

What is claimed is:

1. A scented cover for a pole, which comprises:
   an elongate, hollow member having a slit along the entire length thereof to allow said hallow member to be placed over an elongate pole,
   said hollow member including a fragrant material for providing a desired smell surrounding the pole cover, said hollow member being formed of a flexible and resilient material and being of a cross sectional size and shape substantially the same as that of the pole, said hollow member consisting of an inner layer of foamed plastic material and an outer layer of a solid plastic material.

2. A pole cover as claimed in claim 1 wherein said hollow member is thin so that it does not impair the utility of the pole.

3. A pole cover as claimed in claim 2 wherein said hollow member is substantially cylindrical.

4. A pole cover as claimed in claim 2 wherein said hollow member has a smooth outer surface to enable hangers to easily slide along the length of the pole cover.

* * * * *

UNITED STATES PATENT AND TRADEMARK OFFICE
CERTIFICATE OF CORRECTION

PATENT NO.  :  5,122,401

DATED       :  June 16, 1992

INVENTOR(S) :  Harvey FINKELSTEIN

It is certified that error appears in the above-identified patent and that said Letters Patent is hereby corrected as shown below:

In Column 4:
    line 29, change "hallow" to --hollow--

Signed and Sealed this

Twenty-fourth Day of August, 1993

Attest:

BRUCE LEHMAN

*Attesting Officer*     *Commissioner of Patents and Trademarks*